United States Patent Office 3,338,031
Patented Aug. 29, 1967

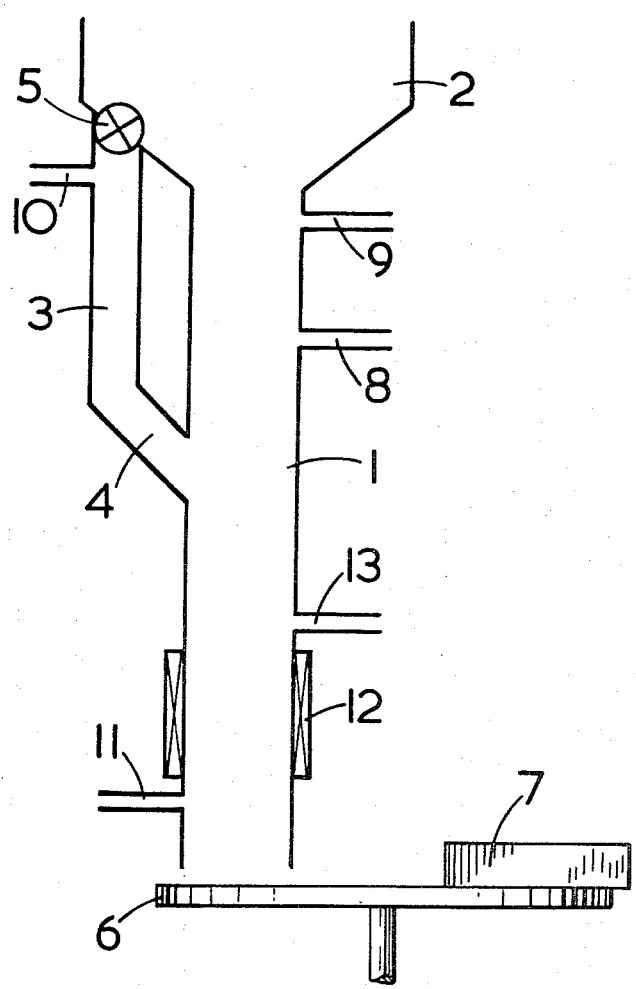

3,338,031
COUNTERCURRENT GAS CHROMATOGRAPHY
AND GAS SOLID ADSORPTION
Philip Edwin Barker, Walsall, and Derek Ian Lloyd, Codnor, England, assignors to National Research Development Corporation, London, England, a British company
Filed June 24, 1964, Ser. No. 377,738
Claims priority, application Great Britain, July 1, 1963, 26,021/63
2 Claims. (Cl. 55—67)

The invention relates to gas-liquid and gas-solid chromatography and gas-solid adsorption and more particularly to methods for carrying out continuous separations by these techniques.

The technique of continuous counter-current gas-liquid chromatographic separation using a moving liquid phase is already known and has been described, for example, by Barker, P. E., and Critcher, D., in "Chemical Engineering Science," 1960, volume 13, pages 82–89. According to the known methods of carrying out this technique, a liquid phase in the form of a finely divided inert solid impregnated with a solvent is moved through a column in counter-current to a stream of carrier gas. The mixture of components to be separated is injected into the column at about its mid-point and the two components move through the solid supporting the liquid phase at different speeds depending on their partition co-efficients between the gas and liquid phases. The speed with which the solid carrying the liquid phase moves is arranged to be intermediate between the speeds, relative to the liquid phase, of the two components to be separated. Thus the faster-moving component tends to move in the direction of motion of the carrier gas, and the slower-moving component tends to move in the direction of motion of the solid particles. If the column is long enough, substantially complete separation is effected, and the two components may be collected by any suitable means at opposite ends of the column.

A similar method has been proposed for gas-solid chromatography, in which a finely divided solid adsorbent, e.g. activated carbon, is used instead of an inert solid impregnated with a solvent.

The technique of separation by counter-current gas-solid adsorption has been described, for example, by Berg, Clyde, in "J. Am. Inst. of Chem. Eng.," 42, 665, (1946). In a gas-solid adsorption process no carrier gas is used, and the process must be operated above the boiling points of the constituents of the mixture.

A disadvantage inherent in simple moving-bed chromatography and adsorption is that a mixture can be separated into only two parts in a single pass through a column.

Columns have been proposed which conditions are set up in different parts of the column, for example by heating certain parts of the column, so that the partition or adsorption co-efficients of the components of the mixture are different in different parts of the column. Thus, for example, if a mixture of A, B and C is injected into the upper part of a chromatographic column, conditions in the upper part of the column are such that A moves with the carrier gas and B and C move with the moving bed, and in the lower part of the column different conditions are set up such that B moves with the carrier gas and C moves with the moving-bed. Then A may be collected at the top of the column, B at the point where conditions change, and C at the bottom of the column. However, complete separation cannot be effected by this method, as the component B will always be contaminated with some of component C.

Another method which has been proposed for separating a multi-component mixture having more than two components is to use a series of columns. In the first column the mixture is separated into two groups of components which are further separated in the other columns. For example, a mixture of A, B and C may be separated in the first column into A and the component group $(B+C)$. The component group $(B+C)$ is then stripped from the carrier gas or moving-bed and fed into another column when it is separated into B and C. This process suffers from the disadvantage that the groups of components must be stripped from the carrier gas or moving-bed between each stage in the sparation.

It is the object of the invention to provide a method whereby substantially complete separations of multi-component mixtures may be made by continuous moving-bed gas chromatography or counter-current gas-solid adsorption in a single-stage process.

Accordingly, the present invention provides a method of separating the components of a multicomponent mixture by counter-current gas chromatography or gas-solid adsorption which comprises continuously transferring the moving-bed together with any material adsorbed on it from one column to an intermediate point in a second column. In operation the mixture is fed to a first column in which the conditions are such that one component moves in counter-current to the moving-bed and the remainder of the mixture leaves the column absorbed or adsorbed on the moving-bed. The moving-bed leaving the first column is continuously transferred to an intermediate point in a second column in which the conditions are such that a further component moves in counter-current to the moving-bed in the second column and the remainder of the mixture leaves the column absorbed or adsorbed on the moving-bed.

If the mixture contains more than three components the moving-bed leaving the second column is continuously transferred to an intermediate point in a third column and the process is repeated until the mixture is separated into the required number of components. If the mixture contains $n$ components, $n-1$ columns will be needed to separate them.

Advantageously, when the method is applied to counter-current gas chromatography, a continuous flow of carrier gas is maintained in counter-current to the moving-bed throughout the columns.

The present invention also provides apparatus for the separation of multicomponent mixtures by counter-current gas chromatography or gas-solid adsorption which comprises two moving-bed columns connected so that the moving-bed passes directly from the bottom of one of the columns to a point intermediate between the ends of the other column.

For the separation of mixtures containing more than three components a series of columns must be used, each column connected to the next so that the moving-bed passes directly from the bottom of each column to a point intermediate between the ends of the next.

Means must be provided for controlling the flow rates of the carrier gas and moving-bed in each column.

Although many separations may be carried out with the columns at ambient temperatures in some cases it will be advantageous to provide for the columns to be heated or cooled. Heating is particularly likely to be necessary when the invention is applied to gas-solid adsorption.

A specific embodiment of the invention as applied to counter-current gas chromatography will now be described with reference to the accompanying drawing which is a diagrammatic cross-section through the apparatus. This embodiment is designed to separate a mixture into three components.

A vertical tube 1 is surmounted by a hopper 2. Also extending downward from the hopper is another tube 3, the lower end of which joins tube 1 at a point 4 part-way down it. The finely divided packing is stored in the hopper 2. If the apparatus is to be used for gas-solid chromatography the packing is a finely divided adsorbent and if it is to be used for gas-liquid chromatography the packing is a finely divided inert solid impregnated with the liquid phase.

The packing flows downward into tubes 1 and 3. The rate of flow into tube 3 is controlled by the star valve 5. The packing flows out of the lower end of the tube 1 onto a turn-table 6, from it is removed by a scraper 7. The rate at which the packing flows out of column 1 is controlled by speed of rotation of the turntable 6 and by the distance between the lower end of the tube 1 and the turntable 6. A mixture of the components is injected into the tube 1 through inlet 8 at a point above the point 4. On this embodiment the part of tube 1 above the point 4 corresponds to the first column of the invention and the tube 3 together with the part of tube 1 below the point 4 corresponds to the second column of the invention.

Packing which has emerged from the lower end of the tube 1 may be returned to the hopper 2 and re-used. On the laboratory scale this is done by hand, but on the industrial scale it would be done by mechanical means, such as by an air-lift.

The components, in order of speed of movement through the solid packing are A, B and C. Conditions in the part of tube 1 above point 4 are such that component A moves with the carrier gas, and is extracted through outlet 9 while components B and C move with the solid packing. The conditions in tube 3 and in the part of tube 1 below point 4 are such that component B moves with the carrier gas and component C moves with the solid packing. Any of component B which is carried in the carrier gas above point 4 in tube 1 is readsorbed onto the packing and carried down again. Any of component B which is carried by the carrier gas into tube 3 continues to move with the carrier gas and is removed through outlet 10. Carrier gas is injected into tube 1 near its lower end through inlet 11. Above this inlet is a heated stripping section 12 where component C is stripped from the solid packing, and component C is removed through outlet 13 immediately above the stripping section. The conditions necessary to cause the components to move in the desired directions are set up by controlling the rates of flow of solid packing and carrier gas through the tubes. The rates of solid flow are controlled, as described, by the turntable 6 and the star valve 5. The rates of gas flow are controlled by the rate at which gas is injected through inlet 11 and extracted through each of outlets 9, 10 and 13.

175 mls./hr. of a mixture of equal parts by volume of benzene, cyclohexane and methylcyclohexane were separated in their constituent parts of 99.9% purity using an apparatus as described above. Tubes 1 and 4 had diameter of 1 inch and ½ inch respectively. The packing was 10–22 mesh firebrick containing 30% w./w. polyoxyethylene 44 diricinoleate. The solid flow rate in tube 1 above point 4 was 1740 grms./hr. and the solid flow rate in tube 3 was 760 grms./hr. Nitrogen was used as the carrier gas. The gas flow rate in tube 1 above point 4 was 310 litres/hr. and the gas flow rate in tube 3 was 188 litres/hr. The tubes were at ambient temperature (20° C.) and the stripping section 12 was at 50° C.

What is claimed is:

1. A chromatographic process for separating the components of a multi-component mixture which comprises moving a bed of solids through a first chromatographic column, moving a bed of solids through a second chromatographic column, continually transferring the bed emerging from said first column to a point intermediate the ends of said second colmn, maintaining a continuous flow of carrier gas counter-current to the bed in each of said columns, feeding said multi-component mixture to be separated to a point intermediate the ends of said first column, maintaining relative flow conditions in said first column such that upon entrance of said mixture into said first column a first component of the mixture moves counter-current to the bed in the first column and the remainder of the mixture moves in the same direction as the bed in the first column, and maintaining relative flow conditions in said second column such that a second component of the mixture, after elution from said second column with carrier gas, moves counter-current to the bed in said second column and the remainder of the mixture moves in the same direction as the bed in said second column.

2. A process according to claim 1 wherein at least one of said columns is heated.

References Cited

UNITED STATES PATENTS

| | | | |
|---|---|---|---|
| 2,609,887 | 9/1952 | Berg | 55—79 |
| 2,869,672 | 1/1959 | Findlay | 55—67 |
| 3,016,107 | 1/1962 | Strange et al. | 55—67 |
| 3,093,465 | 6/1963 | Latta | 55—34 |

OTHER REFERENCES

Barker et al., Chemical Engineering Science, vol. 13, No. 2, pp. 82–89.

Mitchell, The Oil and Gas Journal, vol. 58, No. 2, pp. 73–75.

Schultz, Gas Chromatography 1962, pp. 225–231.

REUBEN FRIEDMAN, *Primary Examiner.*

C. N. HART, *Assistant Examiner.*